Feb. 18, 1947. W. L. BARROW ET AL 2,415,807
DIRECTIVE ELECTROMAGNETIC RADIATOR
Filed Jan. 29, 1942 4 Sheets-Sheet 1
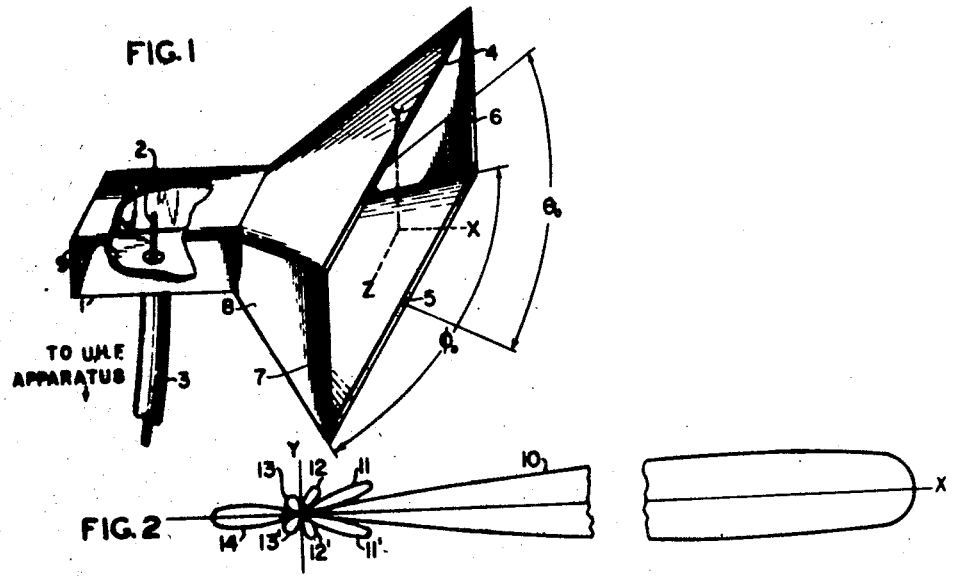
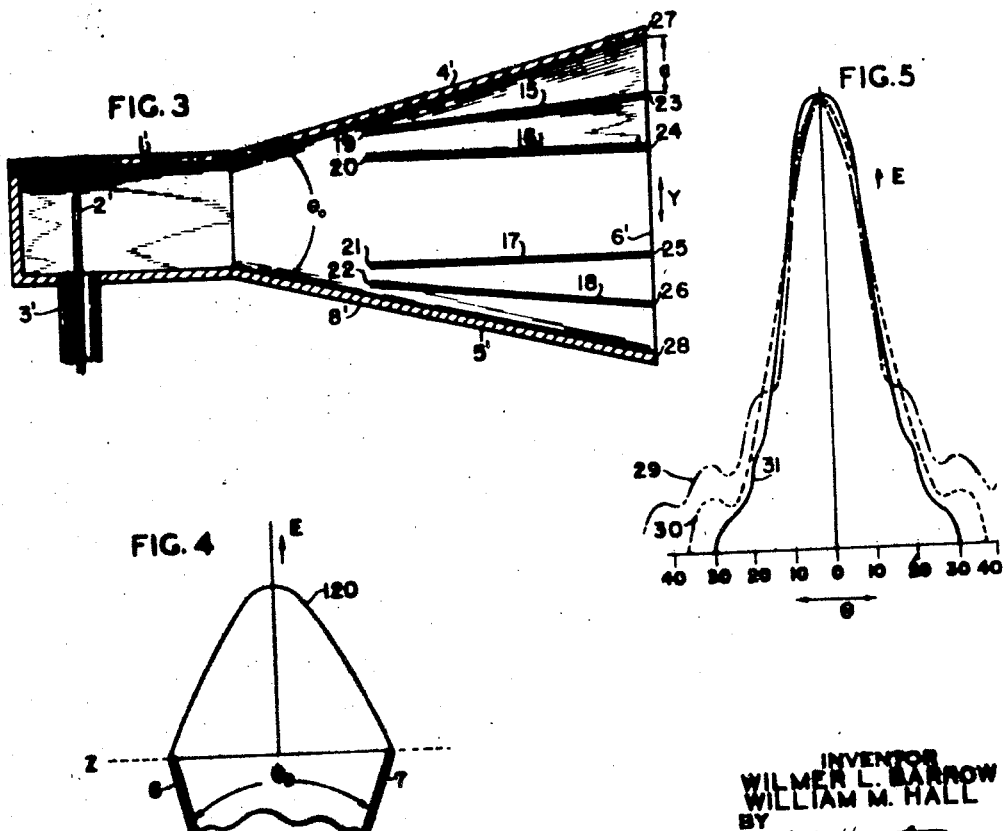
INVENTOR
WILMER L. BARROW
WILLIAM M. HALL
BY
ATTORNEY Feb. 18, 1947.  W. L. BARROW ET AL  2,415,807
DIRECTIVE ELECTROMAGNETIC RADIATOR
Filed Jan. 29, 1942  4 Sheets-Sheet 2

TO RECEIVER OR TRANSMITTER

INVENTOR
WILMER L. BARROW
WILLIAM M. HALL
BY
Paul B. Hunter
ATTORNEY

Feb. 18, 1947.  W. L. BARROW ET AL  2,415,807
DIRECTIVE ELECTROMAGNETIC RADIATOR
Filed Jan. 29, 1942  4 Sheets-Sheet 3
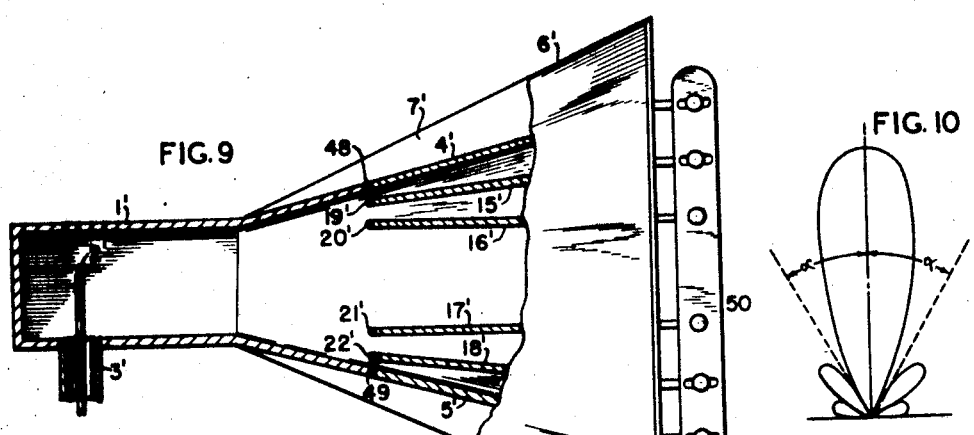
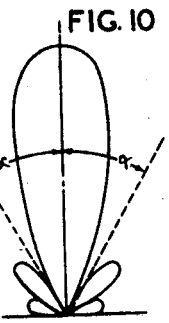
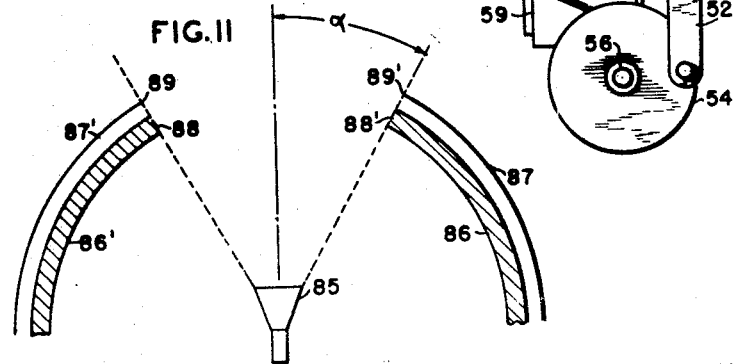
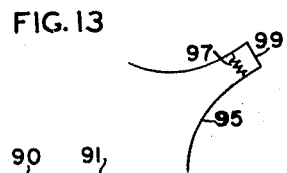
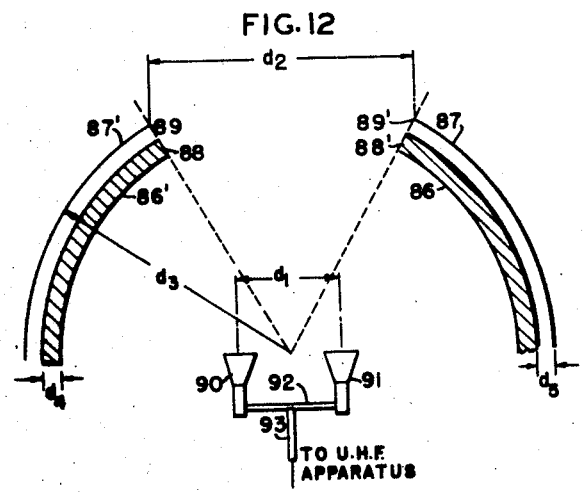
INVENTOR
WILMER L. BARROW
WILLIAM M. HALL
BY
Paul B. Hunter
ATTORNEY Feb. 18, 1947.   W. L. BARROW ET AL   2,415,807
DIRECTIVE ELECTROMAGNETIC RADIATOR
Filed Jan. 29, 1942   4 Sheets-Sheet 4
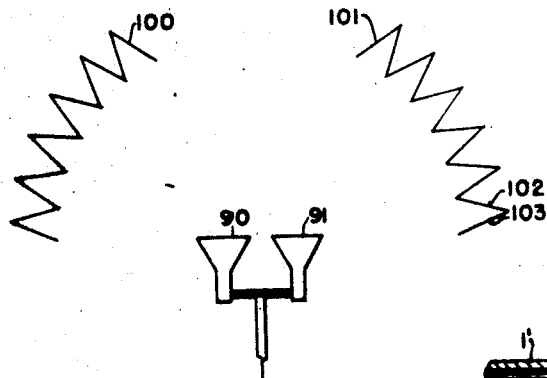
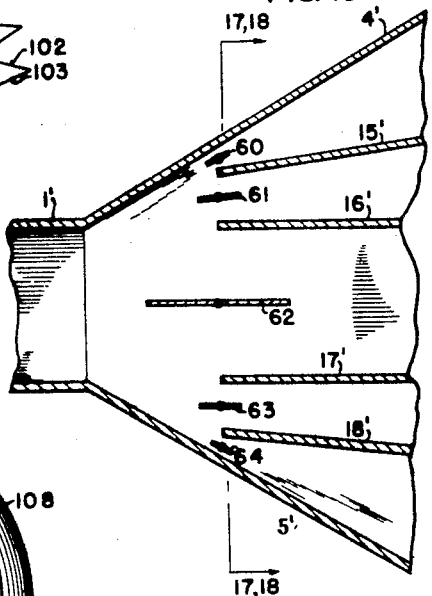
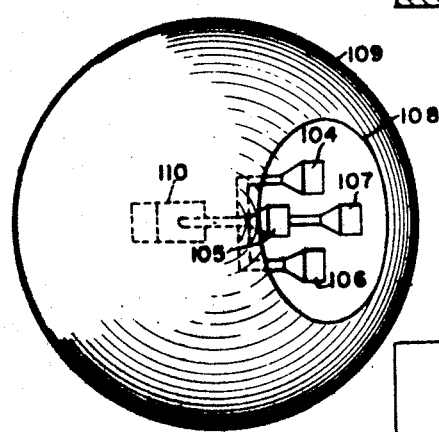
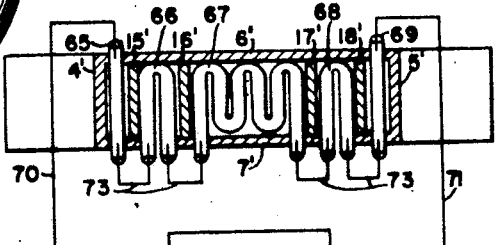
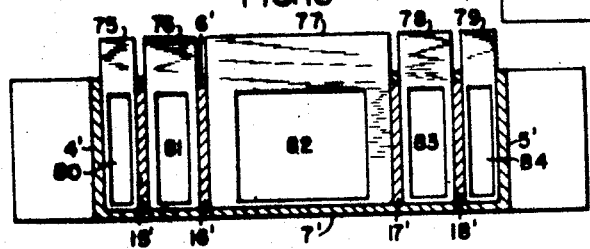
INVENTOR
WILMER L. BARROW
WILLIAM M. HALL
BY
Paul B. Hunter
ATTORNEY Patented Feb. 18, 1947

2,415,807

UNITED STATES PATENT OFFICE 2,415,807

DIRECTIVE ELECTROMAGNETIC RADIATOR

Wilmer L. Barrow, Concord, and William M. Hall, Lexington, Mass., assignors to Sperry Gyroscope Company, Inc., Brooklyn, N. Y., a corporation of New York Application January 29, 1942, Serial No. 428,697

6 Claims. (Cl. 250—11)

This invention relates, generally, to electromagnetic radiators, and more particularly, to means and methods for improving the directivity and for substantially eliminating the secondary lobes from the radiation patterns of sectoral or pyramidal horns such as those disclosed in a patent to W. L. Barrow, one of the present inventors, No. 2,255,042, issued September 9, 1941.

An object of the present invention is to provide a pyramidal electromagnetic horn having improved directivity through the use of energy partitioning means in said horn.

Another object of the invention is to provide an improved electromagnetic horn whose radiation pattern has a smooth contour, secondary lobes being removed or greatly reduced.

A further object is to provide a horn of the above character having external means for the removal of any remaining secondary lobes in the radiation pattern.

Yet another object is to provide a plurality of horns of the above character so arranged as to improve the radiation pattern over that of a single horn.

A still further object of the present invention is to provide a plurality of horns of the above character having external means to absorb the secondary lobes of the radiation pattern of such plurality of horns.

Another object of the invention is to provide a partitioned electromagnetic horn having an electric field intensity at the mouth of said horn that is substantially a half sinusoid, being a maximum on the axis of said horn and zero at its tapered sides.

Still another object is to provide a horn with partitions and sides, pivoted at their inner ends, which may be moved or oscillated by mechanical means at the mouth ends of said partitions and sides in such a manner that the radiation pattern may be directed at or swept over a predetermined angle, meanwhile remaining sharply directive and substantially free from secondary lobes.

Also another object is to provide electronic or mechanical means for varying the energy distribution at the mouth of an electromagnetic partitioned horn by predeterminable amounts from the half sinusoidal distribution characteristic.

A still further object of the invention is to employ the means and methods provided for in the preceding objects interchangeably for radiation or reception purposes as enunciated by the reciprocity theorem.

Other objects and advantages will become apparent from the specification, taken in connection with the accompanying drawings wherein the invention is embodied in concrete form.

In the drawings,

Fig. 1 is a perspective schematic representation of a conventional pyramidal electromagnetic horn.

Fig. 2 is a polar graph of a possible radiation or receiver gain pattern of the horn of Fig. 1.

Fig. 3 is a cross-section plan view of an electromagnetic horn having energy partitioning means.

Fig. 4 is a graph of the electric field intensity at the mouth of a horn such as that of Fig. 1 shown as a function of distance across the horn mouth in the $z$ direction.

Fig. 5 is a graph of the measured radiation pattern in the plane containing the antenna and parallel to the longitudinal axis of such a horn as that of Fig. 3. Relative field intensity is plotted as a function of the angle from the horn axis for different numbers of horn partitions.

Fig. 9 is a plan view of the structure of Fig. 8 in partial section taken along the cutting-plane line 9—9 of the latter figure.

Fig. 10 is an explanatory graph.

Fig. 11 is a plan view of an electromagnetic horn using external secondary lobe suppressing means.

Fig. 12 is similar to Fig. 11 using a plurality of horns in an array.

Fig. 13 is an alternate of Fig. 12.

Fig. 14 is another variation of Fig. 12.

Fig. 15 is still another variation of Fig. 12 using suppressing means for both the vertical and horizontal planes.

Fig. 16 is a fragmentary plan cross-section view of a modified partitioned horn.

Fig. 17 is a cross-section elevation view of an alternate form of Fig. 16 taken along the cutting-plane line 17, 18—17, 18 of the latter figure.

Fig. 18 is an alternate form of Fig. 17.

Similar characters of reference are used in all of the above figures to indicate corresponding parts.

Figure 6:
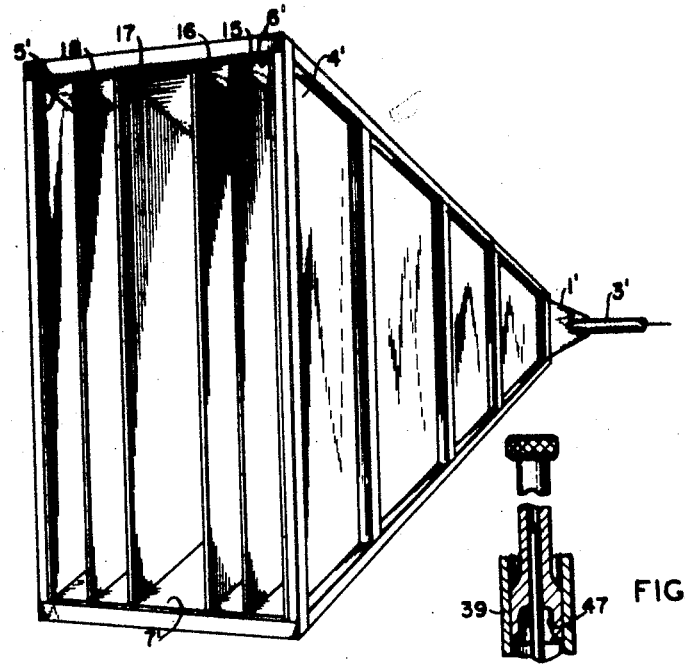
Fig. 6 is a perspective view of a partitioned horn.

Referring now to Fig. 1, there is represented a conventional pyramidal electromagnetic horn whose theory and operation are disclosed in an article by W. L. Barrow and L. J. Chu, entitled "Theory of the electromagnetic horn," and in a companion paper by W. L. Barrow and F. D. Lewis, entitled "The sectoral electromagnetic horn," Proceedings of the Institute of Radio Engineers, vol. 27, No. 1, January, 1939. The horn radiator consists of a rectangular wave guide portion 1, into the side of which projects an antenna 2 terminating a coaxial line 3. Device 2 acts as an energy translation means for electromagnetic waves of the order of a meter or less in length, co-acting with a receiver or transmitter, not shown, at the other end of the line 3. The wave guide portion 1 is closed at the end 9 and connected to the throat of a horn 8 at the opposite end. The horn 8 is formed by having sides 4 and 5 disposed at an angle $$\frac{\theta_0}{2}$$

with respect to the wave guide axis and sides 6 and 7 set at an angle $$\frac{\phi_0}{2}$$

with respect to the same axis. The horn 8 is thus pyramidal in appearance having a flare angle $\phi_0$ in the $x$, $z$ plane and a flare angle $\theta_0$ in the $x$, $y$ plane. As normally excited with a vertical antenna 2, the lines of electric intensity are vertical; that is, parallel to the $y$ axis throughout the interior of the horn. The wave guide portion 1 may vary greatly in length and cross-section shape, but from the standpoint of radiating a wave of strictly linear polarization, horns and wave guides of rectangular cross-section are preferable. By the suitable choice of the flare angle $\phi_0$, the radiation pattern in the $x$, $z$ plane, perpendicular to the antenna 2, may be made sharply directive with a narrow principal lobe and negligible secondary lobes. The selection of the optimum flare angle $\theta_0$ produces a reasonably sharp radiation pattern in the $x$, $y$ plane, parallel to the antenna 2, but is accompanied by appreciable secondary lobes, as shown in Fig. 2.

Fig. 2 illustrates a typical radiation pattern in the $x$, $y$ plane, parallel to the antenna 2, plotted in polar coordinates. The pattern consists of a principal directed lobe 10, and secondary lobes of much less intensity, such as lobes 11, 11', 12, 12', 13, 13', and 14. Means and methods for the removal of such secondary lobes are the chief features of the present invention.

The electric field intensity across the mouth of the horn radiator of Fig. 1 is found to vary half sinusoidally in the $z$ direction, perpendicular to the plane of the antenna 2, to produce radiation patterns in the $x$, $z$ plane having a single principal lobe and secondary lobes of insignificant amplitudes. Curve 120 of Fig. 4 shows this electric field intensity as a function of the $z$ distance across the horn mouth, being zero at the edges and maximum at the center. The field strength across the mouth of the horn radiator of Fig. 1 is substantially uniform in the $y$ direction, parallel to the plane of the antenna 2. Since an undistorted half sinusoidal distribution at the mouth of the horn in the $z$ direction produces a sharp, clean-cut beam in the $x$, $z$ plane without appreciable side lobes, it is a logical hypothesis that a similar field distribution across the mouth of the horn in the $y$ direction should yield a similar satisfactory radiation pattern in the $x$, $y$ plane. Fig. 3 illustrates a means for obtaining this distribution.

Referring particularly to Figs. 3 and 6, there is shown a pyramidal electromagnetic horn radiator consisting of a wave guide portion 1', an antenna means 2' and a concentric line 3' for introduction of the energy to be radiated, and a horn portion 8' consisting of flared sides 4', 5', 6', and 7'. Arranged inside of the horn 8' are shown four partitions 15, 16, 17, and 18. Inner ends 19, 20, 21, and 22 of said partitions are spaced relative to walls 4', and 5' so that energy entering the channels defined by said walls is of an amount suitable to cause a half sinusoidal distribution of field intensity across the mouth of the horn as the energy leaves these channels. Ends 27 and 23, 23 and 24, 25 and 26, 26 and 28 are spaced a distance ($a$) apart, while ends 24 and 25 are spaced a distance ($2a$) apart. The spacing of the mouth ends of the partitions is not critical, as long as the rule is followed that inner ends 19, 20, 21, and 22 of the partitions are so placed that the energy directed toward the mouth of the horn results in a half sinusoidal distribution of field intensity across the mouth. The beneficial results of this partitioning are illustrated in Fig. 5.

Fig. 5 shows measured radiation patterns in the form of graphs of the radiation field intensity as a function of the angle from the axis of symmetry of the radiator for a pyramidal horn with no partitions (graph 29), a horn with two partitions (graph 30), and a horn with four partitions (graph 31), the partitions in each case having been placed according to the aforementioned rule. It is seen that the field pattern for no partitions (graph 29) has considerable energy in secondary lobes, the pattern for two partitions (graph 30) is improved, and the pattern for four partitions (graph 31), is greatly improved.

It seems evident to one skilled in the art that the directivity of such an electromagnetic pyramidal horn may be improved by increasing the number of partitions, always choosing a configuration of partitions which gives the intensity distribution at the mouth of the horn as nearly a half sinusoidal character as possible, so that the present invention is not limited to the use of four partitions. It also appears obvious that such partition devices may be applied by one skilled in the art to forms of horns other than that shown in Figs. 1 and 3, such as those appearing in the aforementioned Patent No. 2,255,042, or other similar devices such as radiating pipes. Also, it seems obvious that, although the present invention has been described only in connection with transmission of energy, it is equally useable as an energy receiving means, the graphs of Fig. 5 then representing gain characteristics as functions of the same parameters, instead of radiated field intensity.

The radiator, fixed in the position shown in Fig. 6, may be used to supply one of the two overlapping beams of a runway localizer in an aircraft instrument landing system. The field pattern of a radiator to be employed in a localizer system should be sharp in both the horizontal and vertical planes. A beam that is narrow in the vertical plane is desirable to prevent radiation from striking the ground, thus minimizing the effects of the ground on the radiation pattern. Sharpness in the horizontal plane is necessary to provide maximum sensitivity to a change in horizontal angle of an aircraft approaching along the equi-signal course defined by the overlapping beams. At the same time high directivity in the horizontal plane reduces the possibility of harmful reflections from neighboring obstructions such as hangars or hills. Sharpness in both planes increases the signal in the useful direction. The pattern must be free from side lobes which might give rise to spurious courses. Horizontally polarized radiation is desired because it reduces the effect of variation in earth conductivity. The partitioned horn shown in Fig. 6 successfully fulfills the above requirements, but it may equally well be employed for point-to-point communication or for other applications where a beam of this character is required. Further details of this partitioned horn are revealed in Fig. 7.

Figure 7:
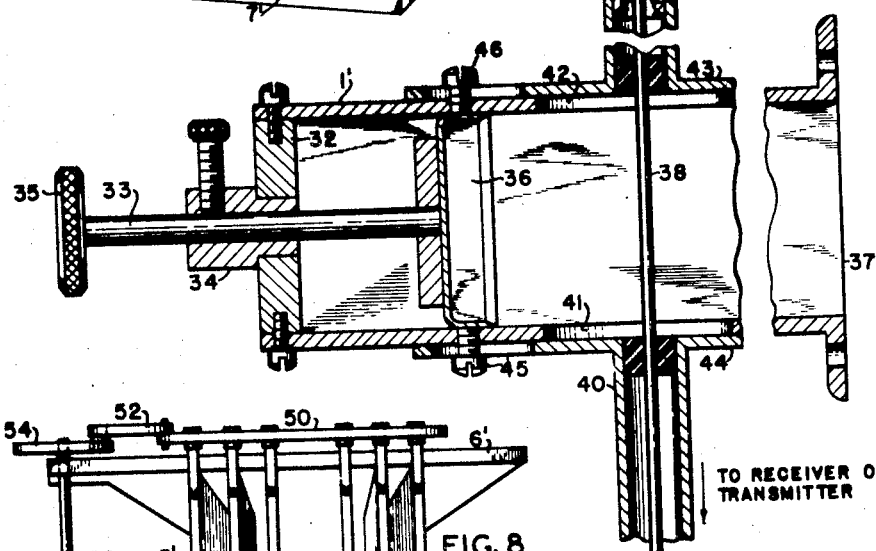
Fig. 7 is an elevation cross-section view of a detail of Fig. 6.

In Fig. 7 the wave guide portion 1' of the electromagnetic horn is shown as a rectangular conducting pipe, closed at one end by a wall 32. The effective length of the wave guide portion 1' is made variable by means of a rod 33 extending through a bushing 34 in the wall 32, said rod adjusting the position of a conducting plunger 36 relative to the throat end 37 of the wave guide 1' by means of a knob 35. Projecting through the wave guide, at right angles to the plane of the partitions of the radiator, is an antenna rod 38, that extends through opposite slots 41 and 42 in the guide. Flanges 43 and 44, which close the slots 41 and 42, and are fixed to the sides of the wave guide 1' by means of screws 45, 46, said screws being also set in slots parallel to the slots 41, 42, support outer conducting tubes 39 and 40, concentric to the inner conductor 38 and projecting outwardly from opposing sides of the wave guide 1'. Thus the antenna wire 38 may be moved in the plane of the drawing by loosening screws 45, 46, thereby adjusting the position of the antenna relative to the throat end 37. Concentric line elements 39, 40, may be extended to attach to high frequency transmitter or receiver means. The line 38, 40 is impedance matched to the wave guide 1' by means of an adjustable plunger 47, slideable over the inner conductor 38 and within the outer conductor 39. Such exciting or receiving means may be preferably used in place of the antenna 2' shown in Fig. 3.

Figure 8:
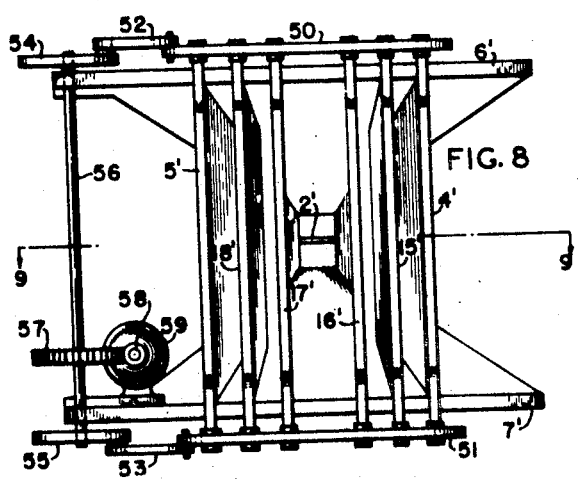
Fig. 8 is an elevation view of the front of a horn having moveable partitions.

Referring now to Figs. 8 and 9, there is shown means for arbitrarily setting a directed beam of improved sharpness, as attained by the previously described partition means, at a particular angle, or for scanning the directed beam over a desired angle at a chosen rate. A coaxial lead 3', an antenna 2', and a wave guide portion 1' are shown similar to their counterparts in Fig. 3. Partitions 15', 16', 17', and 18' are now pivoted at their inner ends 19', 20', 21', and 22', respectively. Likewise, tapered side walls 4' and 5' are broken at points 48 and 49 and are there positioned by pivots. Pivots 48 and 49 are in line with pivots 19', 20', 21', 22', all of the six pivots being fixed to tapered side walls 6', 7'. The walls 4' and 5' and partitions 15', 16', 17', and 18' are now free to swing between the walls 6', 7', which latter are made wide enough at the mouth to correspond to the maximum angle through which the moveable walls and partitions are to be swept. The mouth ends of said walls and partitions are coupled by means of attached links to bars 50 and 51, said bars being substantially parallel and placed slightly above and below the area of the mouth of the horn. Bars 50 and 51 may be coupled to cranks 54 and 55 by means of links 52 and 53, respectively. Cranks 54 and 55, mounted on a common drive shaft 56, may be rotated through gearing 57, 58 by a motor 59. It is evident that linear, intermittent, or any desired motion may be applied to the bars 50, 51 by the substitution of proper devices in place of the reciprocating device shown. It also seems obvious that the walls and partitions may be set at any desired angle to the axis of symmetry of the radiator by adjusting the positions of bars 50, 51 manually, or by other means.

The character of the radiation from an electromagnetic horn such as the pyramidal radiator of Fig. 3 may be modified by introducing wave adjusting means into the inner mouths of the channels defined by the partitions 15', 16', 17', 18' and the sides of the horns. For example, Fig. 16 shows a modified horn that is supplied with rotatable vanes 60, 61, 62, 63, and 64 to close and open alternately the aforementioned channels. Phase relations between said vanes may be made to have any desired character; i. e., the vanes may be all simultaneously closed and then all opened, or the vanes may be closed and opened in such an order that the symmetry of the field pattern may be altered in any desired manner as a function of time.

In Fig. 17 gaseous discharge tubes 65, 66, 67, 68, and 69 fill the inner mouths of the channels bounded by members 4'—15', 15'—16', 16'—17', and 18'—5', respectively. A modulated power supply 72 is connected by leads 70, 71, and 73 to the gas tubes 65, 66, 67, 68, and 69. These connections may be made in such a manner that a modulating device 74 controlling the power supply 72 causes the tubes to discharge in any desired order and current intensity. It is well known to those skilled in the art, that the presence of ionized gas in the path of electromagnetic radiation severely modifies the radiant energy, undisturbed by non-ionized gas. Thus the wave energy traversing each channel may be altered according to any chosen function of time.

Fig. 18 shows a device similar to that of Fig. 17 in which gates 75, 76, 77, 78, 79 may be introduced into corresponding channels. Holes 80, 81, 82, 83, 84 in gates 75, 76, 77, 78, and 79, respectively, may be made of any suitable area, and the gates may be made to occupy the channel mouths for any suitable time intervals and in any desired order by obvious mechanical means such as a rotating crankshaft connected to these gates. It is to be understood that the devices shown in Figs. 8, 9, 16, 17, and 18 are equally useful in altering the response pattern of the horns when used for receiving purposes.

Further sharpening of the radiation patterns of electromagnetic horns may be provided by the devices shown in Figs. 11-15. Fig. 10 illustrates a radiation pattern plotted in polar coordinates for a horn whose undesirable secondary lobes are much exaggerated for clarity in drawing. The angle between the axis of symmetry and the first minimum on either side of the principal radiation lobe is defined as the angle $\alpha$.

Fig. 11 is a view of an electromagnetic horn 85 positioned between two semi-cylindrical absorbing wall portions 86 and 86' and concentric reflecting wall portions 87 and 87' of somewhat greater diameter. Openings are left in the walls 86, 86' and 87, 87' in front of the horn 85 that preferably subtend an angle $2\alpha$, equal to the spread of the principal radiation lobe. The edges 88, 88', 89, and 89' of the walls 86, 86' and 87, 87' are, therefore, placed in a region of minimum radiation. Little or no energy strikes the edges 88, 88', 89, and 89' of the walls to introduce new secondary lobes by diffraction or scattering, and the undesirable secondary lobes of the original radiation pattern are attenuated in the absorbing walls 86, 86', the energy passing initially through these walls being reflected by the walls 87, 87' and substantially totally absorbed during the second passage through the walls 86, 86'. If it is necessary to remove the backwards directed radiation sides 86 and 87 may be continued around so as to connect with sides 86' and 87', thereby forming continuous walls.

Fig. 12 shows a horn array employing external radiation absorptive means similar to that of Fig. 11. Two sources 90 and 91, connected by a wave guide 92, and excited by a common transmitter through a conductor 93, are separated a distance $d_1$ of one or more wavelengths. The mouths of the horns 90 and 91 are parallel and the center of the array is a distance $d_3$ from the reflecting walls 87 and 87'. The absorbing walls 86 and 86' have a thickness $d_4$ and are separated a distance $d_5$ from the exterior reflecting walls 87 and 87'. These walls may extend any desired degree around the array, always leaving an opening of a width $d_2$ for the radiation of the principal lobe of energy.

The theory of arrays such as that of Fig. 12 is disclosed in an article by W. L. Barrow and Carl Shulman, entitled "Multiunit electromagnetic horns," Proceedings of the Institute of Radio Engineers, vol. 28, No. 3, March, 1940. Without absorptive means, these radiators, which may be partitioned electromagnetic horns, would produce a radiation pattern in the plane of the drawing characterized by a very sharp principal beam and a number of secondary lobes. As is well known from the theory of directive antenna systems, the resultant radiation pattern may be expressed by the relation:

$$\overline{E} = \overline{F} \cdot \overline{G}$$

where $\overline{E}$ is the resultant electric field intensity, $\overline{F}$ is the element function representing the radiation pattern of each of the horns 90, 91, and $\overline{G}$ is a group function which depends upon the spacing $d_1$ of the horns. By adjusting $d_1$, the group function $\overline{G}$, which expresses the result of constructive and destructive interference of the waves emanating from horns 90 and 91, may effect a sharpening of the principal beam, accompanied, however, by an increase in the number and magnitude of the secondary lobes.

In the operation of the structures of Fig. 11 and 12, the absorption of the secondary lobes is due to the characteristics of the absorbing walls 86 and 86'. These walls, made of a poorly conducting material of conductivity $\sigma$, permeability $\nu$, and dielectric constant $\epsilon$, is placed, as previously mentioned, in front of the substantially perfect reflecting surface of walls 87, 87'. By adjusting the material constants $\sigma$, $\nu$, and $\epsilon$ of the walls 86, 86' and particularly their net conductivity as well as the distance $d_5$ between walls 86, 86' and walls 87, 87', a substantially complete absorption of incident waves may be obtained. Certain critical relations between the wavelength, $\sigma$, $d_5$, and the wall thickness $d_4$ may be found, either by theoretical calculations or by experimental measurements, both procedures being known to the art. In one example of such critical relations, $d_5$ is made zero, and $d_4$ is made approximately equal to one quarter of the wavelength in the medium of the wall 86, 86'.

Practical considerations may make it advisable to locate the walls 86, 86' and 87, 87' closer to the horns than would be required to keep them in the "wave zone" where the true radiation pattern exists. Under these conditions $d_2$ does not subtend an angle at the center of the array equal to $2\alpha$, the angle of the principal beam in the radiation pattern. If $d_3$ is made comparable to $d_1$ in size, the best value of $d_2$ may be found empirically. For example, in one experimental structure a pair of horns whose horizontal aperture and radial length were 35 cm. and 46 cm., respectively, were excited with 8.3 cm. electromagnetic waves. The optimum values of $d_1$, $d_2$, and $d_3$ were found to be 40.5 cm., 58 cm., and 97 cm., respectively. A very sharp principal beam was produced substantially free of secondary lobes.

Removal of undesired radiation lobes from portions of the radiation pattern of a single or multiple horn radiator can also be accomplished by electromagnetic horn absorptive means such as shown in Fig. 13. Horns 94 and 95 are shown spaced to absorb secondary lobes emitted over a certain small angle adjacent to the primary lobe. Horns 94 and 95 may be similar to that of Fig. 1, or of any of the types disclosed in aforementioned Patent No. 2,255,042. Horns 94, 95 may have power absorbing devices, such as a relatively thin sheet of carbon, positioned at 96, 97, at an appropriate distance from their closed ends 98, 99, respectively. By proper design, horns 94, 95 may effect a substantially perfect or reflectionless match to outer space, so that energy entering these horns will be completely dissipated therein. If desired, a plurality of absorbing horns 94, 95 can be made to encircle radiators 90 and 91 except in the desired direction of emission.

Fig. 14 discloses an alternate form of the device of Fig. 13, wherein the absorbing horns 94, 95 are replaced by accordion type reflecting structures 100 and 101, such as copper, placed in corrugated, or successive V-configuration surrounding the portions of the radiation field of horns 90, 91 from which secondary lobes are to be removed. Energy entering one of the V-shaped spaces between adjacent sheets, such as that defined by conducting sheets 102, 103, will be reflected back and forth between sheets, losing some energy on each reflection in heat. If the angle between the sides is small enough, substantially all of the wave energy will be converted to heat and but little will remain to be reflected out of the V. If desired, absorbing material such as shown in Figs. 11 and 12 may be included between the sheets 102 and 103.

The device described in connection with Fig. 12 for the suppression of secondary lobes accomplishes this result chiefly in one plane. The method there described can also be applied, however, so that undesired lobes can entirely be removed from a radiation pattern, leaving a single lobed volume in space as the radiation or reception gain characteristic. Such a modification is illustrated in Fig. 15.

In Fig. 15 is shown a plurality of radiators 104, 105, 106, 107, excited by a common source 110 of electromagnetic energy. Surrounding the radiation system is a sphere 109, which may be composed of any of the elements disclosed in Figs. 12, 13, or 14. The exact arrangement and shape of the absorber 109 may vary with the number and arrangement of radiation or receiving elements. An annular arrangement of the screen may be used, as may many other modifications which are in the scope of the present invention.

It appears obvious that the means herein described in connection with Figs. 11, 12, 13, 14, and 15 for removing secondary lobes may also be used with single partitioned or non-partitioned electromagnetic horns or with a plurality of such horns, or with other radiative or energy receiving means such as dipoles, parabolas, or any other well known type of antenna or antenna array. It seems evident that the absorptive means may be adjusted to cut off a portion of the primary lobe in addition to the secondary lobes, or may allow certain secondaries to pass, as desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A directive electromagnetic antenna structure comprising an electromagnetic horn body, means within said horn body for radiating or receiving substantially linearly polarized electromagnetic energy, and partitioning means forming passages within said horn body having a transverse dimension coextensive therewith, substantially perpendicular to the plane of said polarized energy, said passages having cross sectional areas progressively changing relative to the total cross sectional area of said horn body along the length thereof, for modifying the directional pattern of said antenna structure.

2. A directive electromagnetic antenna structure comprising an electromagnetic horn, means within said horn for radiating or receiving substantially linearly polarized electromagnetic energy, said horn including energy partitioning means having a relative spacing in the plane of said polarization progressively altered along the length of said partitioning means for effecting a desired alteration of the normal electric field intensity across the mouth of the horn in the plane of said polarization.

3. Means for directionally radiating electromagnetic energy, comprising an electromagnetic horn, means for launching substantially linearly polarized electromagnetic energy within said horn for passage therealong, and partitioning means within said horn for subdividing the interior thereof into channels extending generally along the principal axis of said horn, said channels having a transverse dimension coextensive with said horn, said partitioning means having a relative spacing varied along the length of said horn for altering the normal electric intensity at the mouth of said horn in the plane of said polarization.

4. Means for directionally radiating electromagnetic energy, comprising an electromagnetic horn, means for launching substantially linearly polarized electromagnetic energy within said horn for passage therealong, said horn including energy-partitioning means disposed substantially perpendicular to the plane of said polarized energy, said partitioning means having a relative spacing in the plane of said polarization progressively altered along the length of said partitioning means for effecting a desired alteration of the normal electric field intensity across the mouth of said horn.

5. Means for directionally radiating electromagnetic energy, comprising an electromagnetic horn, means for launching substantially linearly polarized electromagnetic energy within said horn for passage therealong, said horn including energy-partitioning means disposed substantially perpendicular to the plane of said polarized energy, said partitioning means having inner and outer ends placed adjacent the throat and mouth, respectively, of said horn, the relative transverse spacing of said inner ends being adjusted with respect to the relative transverse spacing of said outer ends for producing a substantially half sinusoidal intensity distribution across the mouth of said horn in the plane of said polarization.

6. A directive electromagnetic antenna structure comprising an electromagnetic horn, means within said horn for radiating or receiving substantially linearly polarized electromagnetic energy, said horn including septa disposed substantially perpendicularly to the plane of said polarized energy, said septa having inner and outer ends placed adjacent the throat and mouth, respectively, of said horn, the relative transverse spacing of said inner ends being adjusted with respect to the relative transverse spacing of said outer ends for producing a desired redistribution of the electric field intensity across the mouth of said horn in the plane of said polarization.

WILMER L. BARROW.
WILLIAM M. HALL.

REFERENCES CITED

The following references are of record in the file of this patent:

UNITED STATES PATENTS

| Number | Name | Date |
| --- | --- | --- |
| 2,206,683 | Wolff | July 2, 1940 |
| 2,160,853 | Gerhard et al. | June 6, 1939 |
| 2,064,582 | Wolff | Dec. 15, 1936 |
| 2,283,935 | King | May 26, 1942 |